US006317962B1

(12) United States Patent
Adachi et al.

(10) Patent No.: US 6,317,962 B1
(45) Date of Patent: Nov. 20, 2001

(54) METHOD FOR PRODUCING A STATOR OF AN ALTERNATING-CURRENT DYNAMO-ELECTRIC MACHINE

(75) Inventors: Katsumi Adachi; Etsuji Yano; Kyoko Kurusu, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 698 days.

(21) Appl. No.: 08/621,988

(22) Filed: Mar. 26, 1996

(30) Foreign Application Priority Data

Oct. 6, 1995 (JP) .................................................. 7-260339

(51) Int. Cl.⁷ .................................................. H02K 15/02
(52) U.S. Cl. .................................. 29/596; 29/606; 29/609; 310/42; 310/216; 310/218
(58) Field of Search .............................. 29/596, 598, 609, 29/606; 310/42, 216, 218

(56) References Cited

U.S. PATENT DOCUMENTS

| | | | |
|---|---|---|---|
| 3,802,066 | * 4/1974 | Barrett | .................................... 29/596 |
| 4,102,040 | * 7/1978 | Rich | .................................... 29/596 X |
| 4,116,033 | 9/1978 | Iwaki et al. . | |
| 4,365,180 | * 12/1982 | Licata et al. | ........................ 29/598 X |
| 5,592,731 | * 1/1997 | Huang et al. | ........................... 29/596 |

FOREIGN PATENT DOCUMENTS 5234301   3/1977  (JP) .

* cited by examiner

Primary Examiner—Carl E. Hall
(74) Attorney, Agent, or Firm—Sughrue, Mion, Zinn, Macpeak & Seas, PLLC

(57) ABSTRACT

In a method for producing a stator of an alternating current dynamo-electric machine, a laminated assembly with a roughly rectangular parallelopiped shape is produced, and a stator coil assembly is disposed in slots of the laminated assembly. Thereafter, a cylindrical stator core is produced by bending the laminated assembly. The stator coil assembly can thereby be easily disposed in the slots at a higher density, and damage to the conductors of the stator coil assembly can be prevented.

11 Claims, 9 Drawing Sheets

METHOD FOR PRODUCING A STATOR OF AN ALTERNATING-CURRENT DYNAMO-ELECTRIC MACHINE

BACKGROUND OF THE INVENTION

1. Field of the Invention

The present invention relates to a method for producing a stator of an alternating current dynamo-electric machine, for example, an alternating current generator for automobiles, which is driven by an automobile engine, or the like.

2. Description of the Related Art

FIG. 4 is a cross-sectional view showing an example of an alternating current generator for automobiles to which the present invention can be applied. In this figure, a rotor 1 includes a rotating shaft 11, a pair of claw pole field cores 12 mounted to the rotating shaft 11, and a field coil 13 fixed within the pair of field cores 12. The rotating shaft 11 is rotated by transmitting a driving force of an automobile engine through a belt (not shown).

A stator 2 surrounding the rotor 1 includes a stator core 21 and a stator coil assembly 22 fixed to the stator core 21. The inner peripheral surface of the stator 2 is opposed to the outer peripheral surface of the rotor 1 through a gap. The stator 2 is held in place between a front bracket 3 and a rear bracket 4. Furthermore, the rotor 1 is supported by the front bracket 3 and the rear bracket 4 through bearings 31 and 41 respectively.

A conventional method for producing the stator 2 will now be described in conjunction with FIG. 5. First, a strip 20 having a plurality of slots is cut from a long, narrow steel plate as shown in FIG. 5. At this time, two strips 20 can be cut from one steel plate. Next, one strip 20 is wound into a ring to produce the stator core 21 having a prescribed semi-diameter as shown in FIG. 6. A plurality of slots 21a are provided on the inner peripheral surface of the stator core 21.

On the other hand, the stator coil assembly 22 is formed into a cylindrical shape as shown in FIG. 7. The cylindrical stator coil assembly 22 is brought into the inside of the cylindrical stator core 21 along a guide (not shown) by an assembling apparatus (not shown) while bending its end portion, and thereafter inserted into the slots 21a of the stator core 21 to obtain the stator 2 as shown in FIG. 8.

Further, methods disclosed, for example, in U.S. Pat. No. 416,033 and Japanese Patent Laid-Open No. 52-34301 are known as methods for producing the cylindrical stator core 21.

In the conventional method for producing the stator 2 as described above, the stator coil assembly 22 is inserted into the slots 21a after being pre-formed into the cylindrical shape so as to correspond to slots 21a disposed cylindrically. This assembly operation is complicated and the stator coil assembly 22 is sometimes damaged. Therefore, a production efficiency is reduced. Further, the stator coil assembly 22 cannot be inserted into the slots 21a at a higher density, so output cannot be improved.

SUMMARY OF THE INVENTION

The present invention has been achieved with a view toward solving the problems described above, and further, it is an object of the present invention to provide a method for producing a stator of an alternating current dynamo-electric machine which is capable of easily disposing a stator coil assembly in slots of a stator core at a higher density and which also is preventing damage to conductors of the stator coil assembly.

To this end, according to an aspect of the present invention, there is provided a method for producing a stator of an alternating current dynamo-electric machine, comprising the steps of: laminating a plurality of magnetic strips together to produce a laminated core assembly with a rectangular parallelopiped shape having a plurality of slots; disposing a stator coil assembly in the slot; and bending the laminated core assembly together with the stator coil assembly to produce a cylindrical stator.

DETAILED DESCRIPTION OF THE PREFERRED EMBODIMENTS

Figure 1:
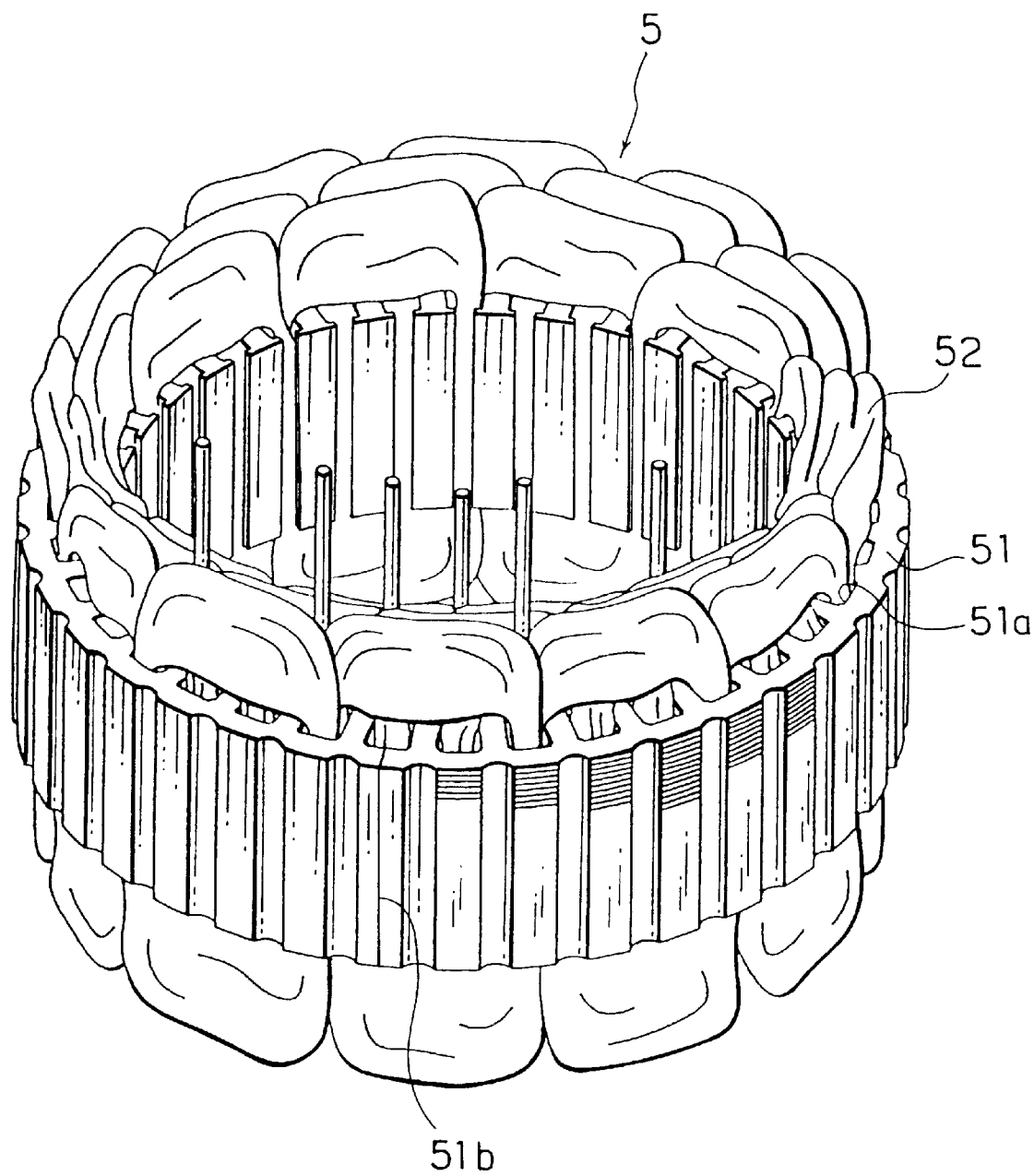
FIG. 1 is a perspective view showing an example of an alternating current generator for automobiles as produced by a method of this invention.
Figure 4:
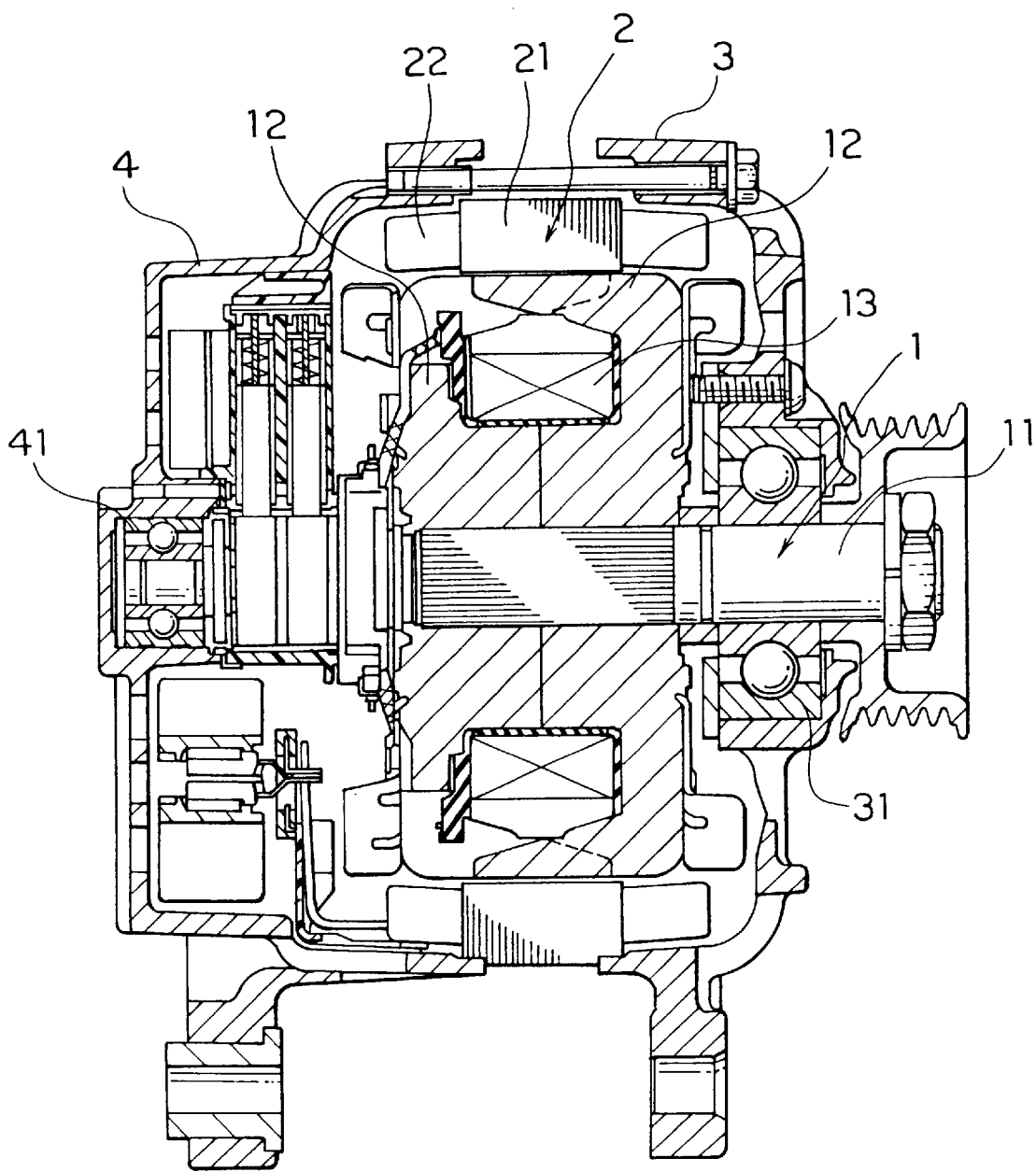
FIG. 4 is a cross-sectional view showing an example of an alternating current generator for automobiles.

The embodiments according to the present invention will now be described with reference to the accompanying drawings. FIG. 1 is a perspective view showing an example of an alternating current generator for automobiles as produced by a method of this invention. In this figure, a stator 5 includes a cylindrical stator core 51 having a plurality of slots 51a, and a stator coil assembly 52 disposed in the slots 51a. Further, the stator core 51 has a single welded portion 51b somewhere on its circumference. The construction of the whole alternating current generator is the same as FIG. 4.

Figure 5:
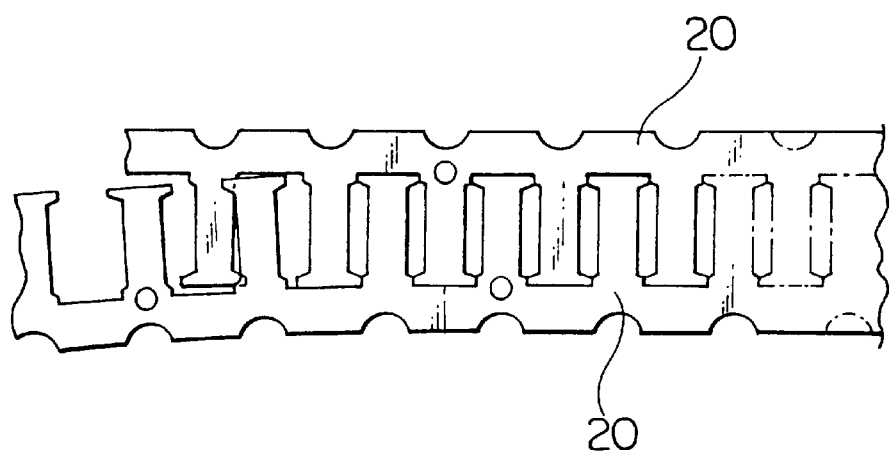
FIG. 5 is a plan view showing strips which compose a stator core.
Figure 6:
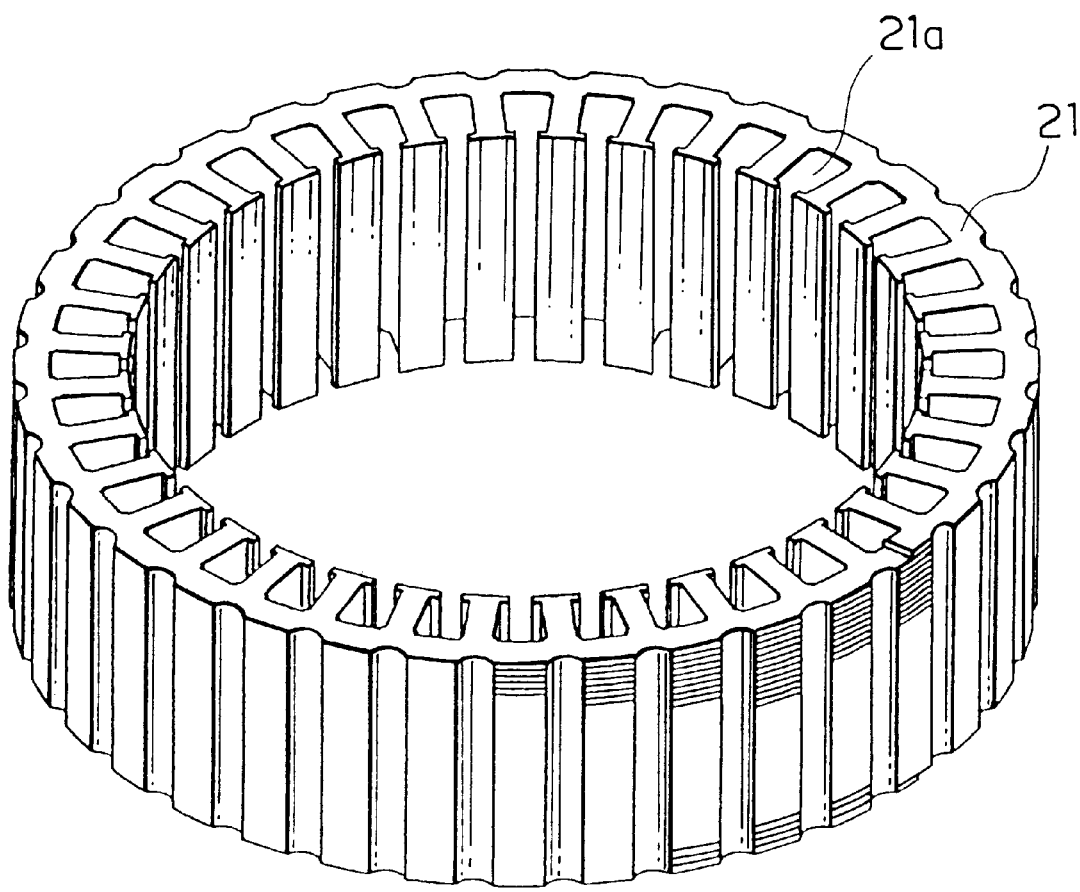
FIG. 6 is a perspective view showing a cylindrical stator core.
Figure 7:
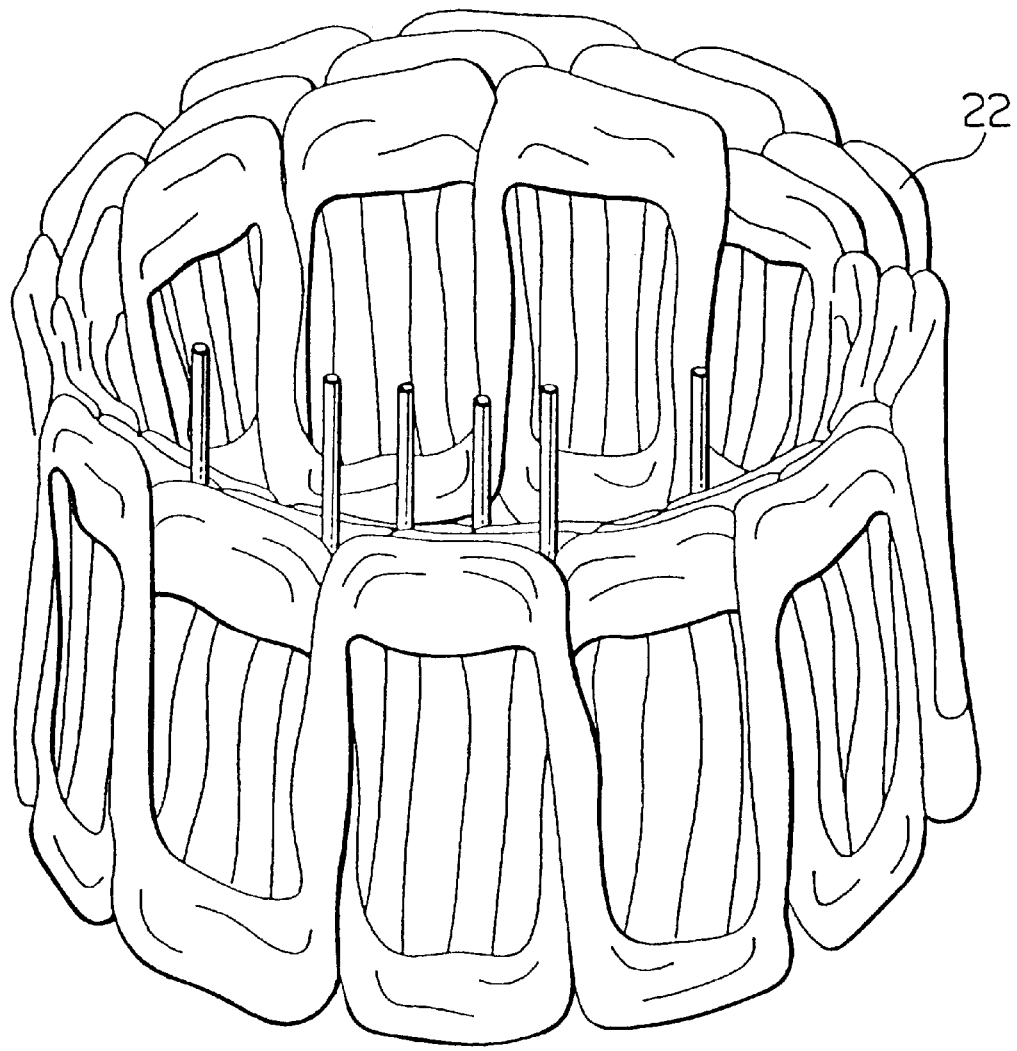
FIG. 7 is a perspective view showing a cylindrical stator coil assembly.
Figure 8:
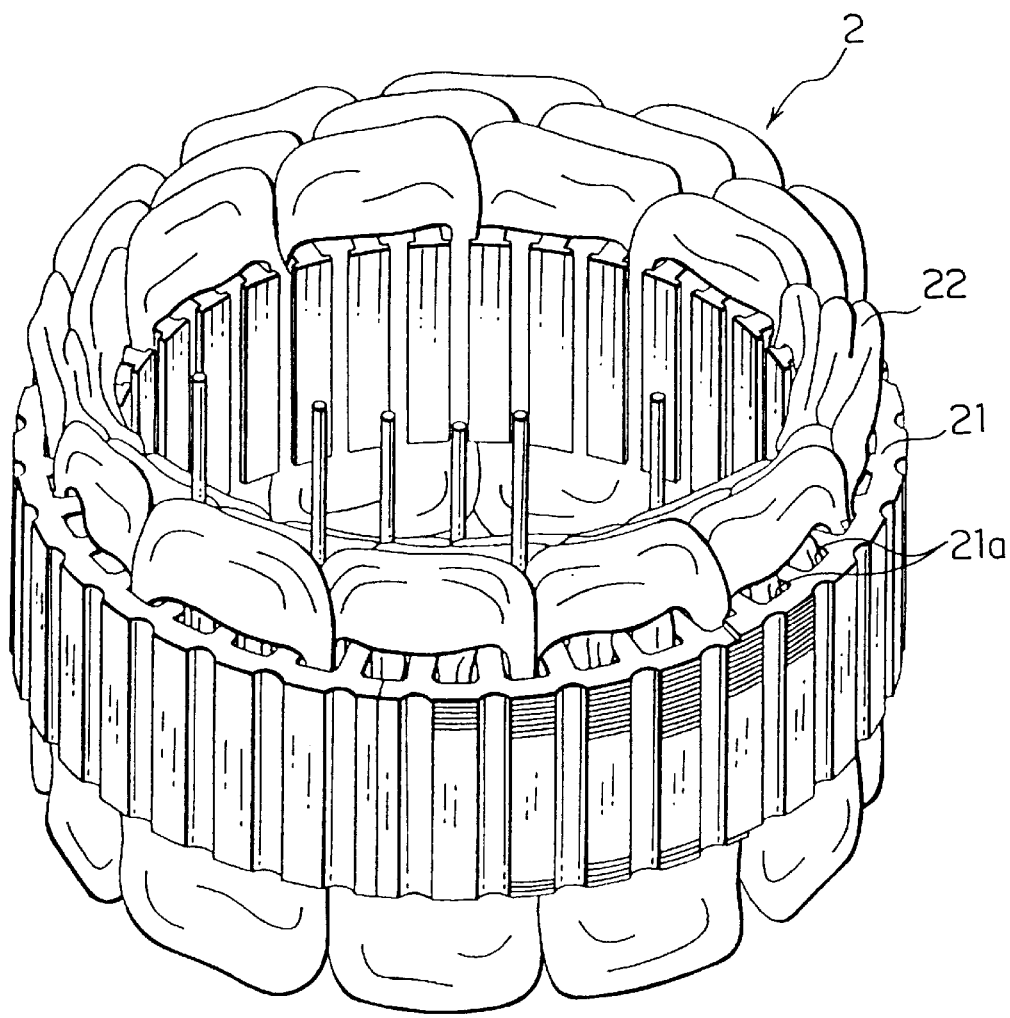
FIG. 8 is a perspective view showing the stator core of FIG. 6 after fixing the stator coil assembly of FIG. 7 thereto.

A method for producing the stator 51 will now be described. First, strips 20 shown in FIG. 5 are cut into a prescribed length. The strips 20 may have, for example, a width of 30 mm and a thickness of 1 mm. Thereafter, a plurality of cut strips 20 are laminated together to produce a laminated assembly 50 with a roughly rectangular parallelopiped shape as shown in FIG. 2.

Figure 2:
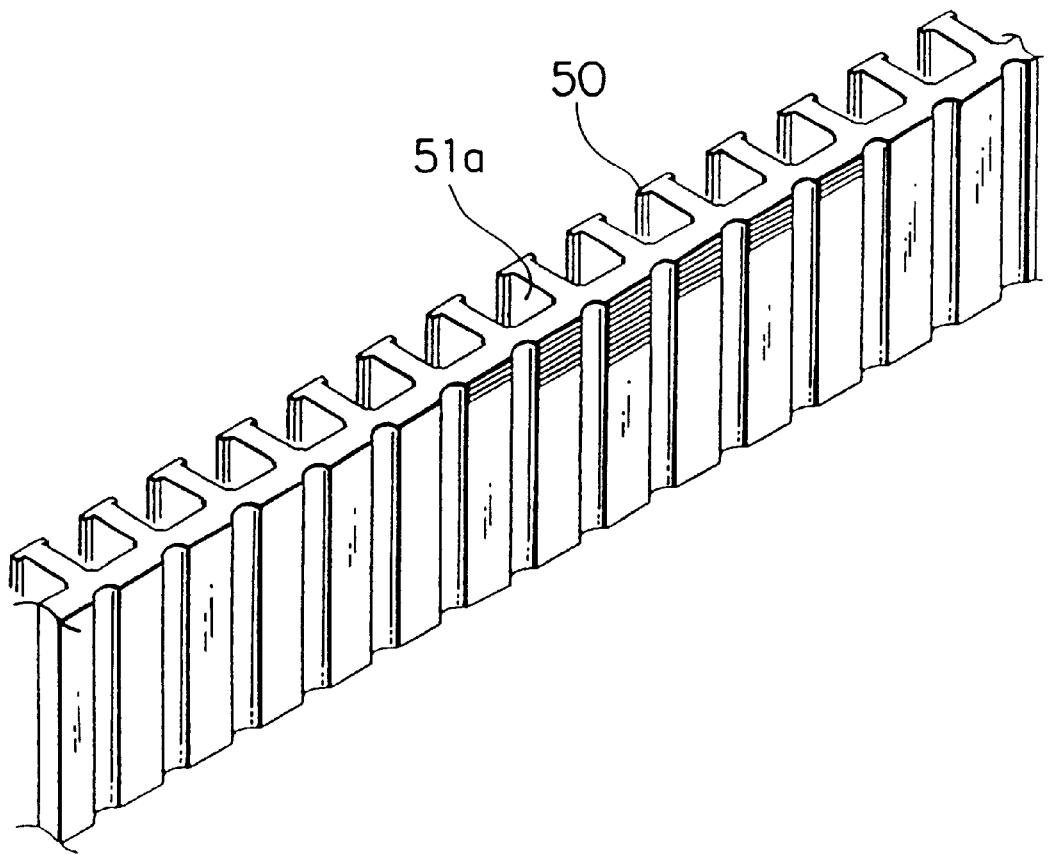
FIG. 2 is a perspective view showing the stator core of FIG. 1 before being formed.
Figure 3:
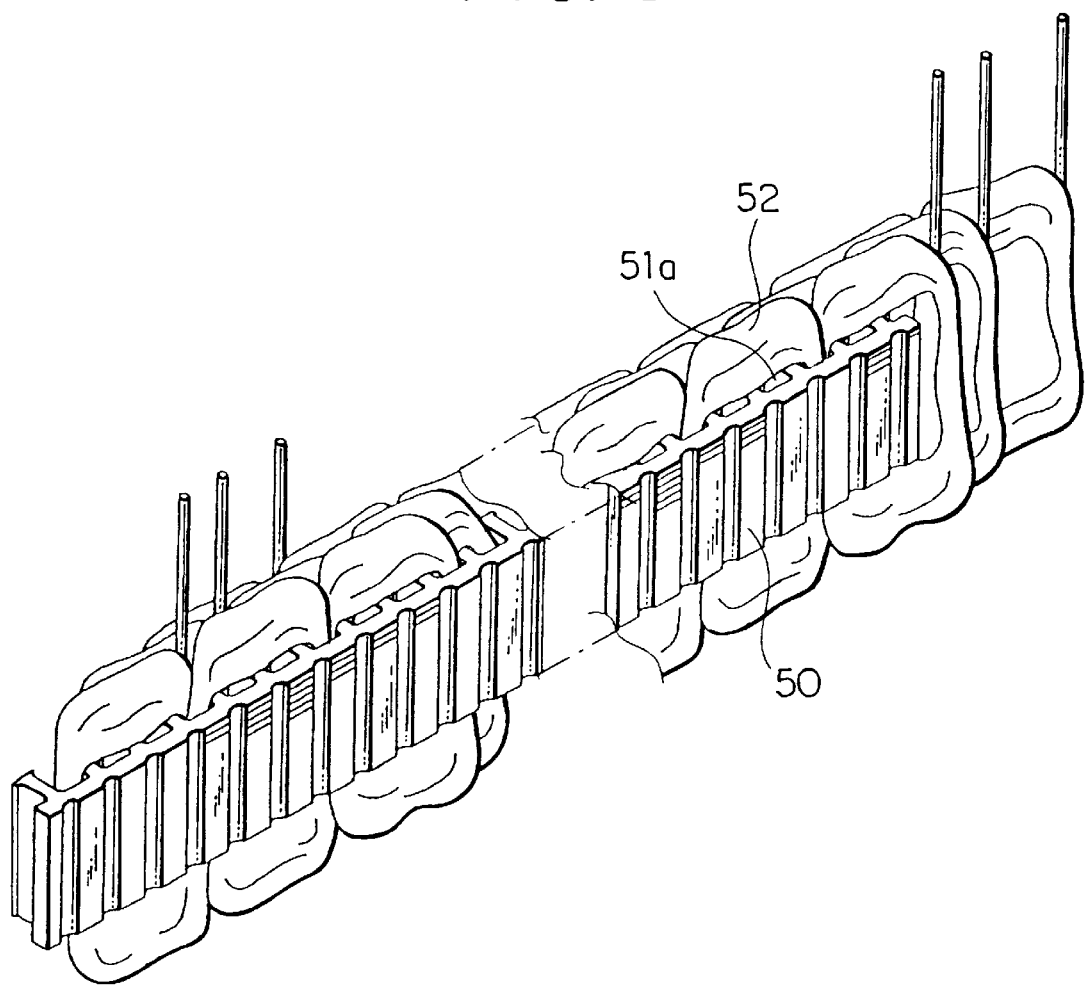
FIG. 3 is a perspective view showing a laminated assembly of FIG. 2 after disposing a stator coil assembly.

On the other hand, the stator coil assembly 52 is preformed into a shape which is generally flat and which needs not be further formed within the slots 51a of FIG. 2, and thereafter inserted into the slots 51a as shown in FIG. 3. In other words, the stator coil assembly 52 is preformed before it is inserted into the slots 51a so as to be ready for the insertion. Next, the laminated assembly 50 is bent into a cylindrical shape by a forming machine (not shown) to produce the stator core 51. After the bending process, both ends of the laminated assembly 50 are welded together along the welding portion 51b of FIG. 1.

In the method for producing the stator 5 as described above, when the stator coil assembly 52 is to be inserted into the slots 51*a*, the stator coil assembly 52 is required to be moved only in one direction relative to the straight stator core 51, so that the stator coil assembly 52 is easily disposed in the slots 51*a* at a higher density. Further, since no excess bending force is applied to the stator coil assembly 52, damage to the conductors of the stator coil assembly 52 is prevented. Additionally, since it is not necessary to pre-form the stator coil assembly 52 into the cylindrical shape, production of the stator coil assembly 52 is facilitated. Therefore, production efficiency of the stator is increased.

Figure 9:
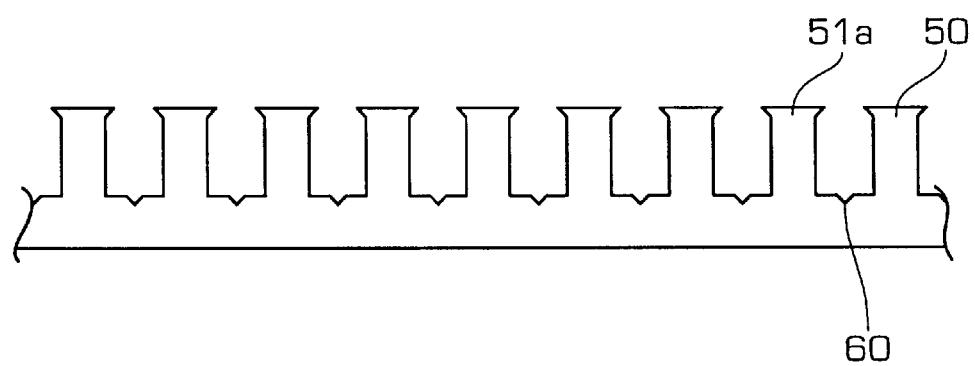
FIG. 9 shows an embodiment of a laminated assembly.
Figure 10:
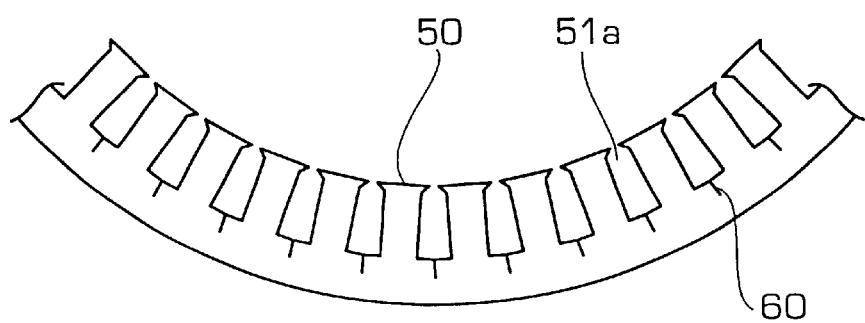
FIG. 10 shows the laminated assembly of FIG. 9 in a bent state.

Moreover, as shown in FIG. 9, it is also possible that slits 60 be provided on the bottom portion of the slots 51*a* of the laminated assembly 50, making the laminated assembly 50 easier to be bent. As shown in FIG. 9 the size of each of the slits 60 is set so that the slits 60 are compressed to disappear when forming the stator core 51 cylindrically, thus the slits 60 have no negative influence upon the magnetic field.

While in the above embodiment, one stator core 51 is made from one laminated assembly 50, it is also possible that a cylindrical stator core is made by assembling a plurality of stator cores bent into circular arc shapes respectively.

Further, a method for producing a stator of this invention is applicable to alternating current dynamo-electric machines other than alternating current generators for automobiles.

What is claimed is:

1. A method for producing a stator of an alternating current dynamo-electric machine, comprising the steps of:
   (a) laminating a plurality of magnetic strips together to produce a laminated core assembly with a rectangular parallelopiped shape having a plurality of slots;
   (b) disposing a stator coil assembly in said slots; and
   (c) bending said laminated core assembly together with said stator coil assembly to produce a cylindrical stator.

2. A method for producing a stator of an alternating current dynamo-electric machine according to claim 1, further comprising the step of:
   (d) preforming said generally flat shaped stator coil assembly to be ready for insertion into said slots of said laminated core assembly.

3. A method for producing a stator of an alternating current dynamo-electric machine according to claim 1, further comprising the step of:
   (d) welding both ends of said laminated core assembly together after the step (c) of bending said laminated core assembly.

4. A method for producing a stator of an alternating current dynamo-electric machine, comprising the steps of:
   (a) laminating a plurality of magnetic strips together to produce a laminated core assembly having a rectangular parallelopiped shape and having a plurality of slots;
   (b) disposing generally flat shaped electrical windings in said slots; and
   (c) bending said laminated core assembly to form at least an arc of a cylindrical stator, wherein said laminated core assembly is bent after said electrical windings are disposed in said slots.

5. A method for producing a stator of an alternating current dynamo-electric machine according to claim 4, wherein said electrical windings constitute a stator coil assembly.

6. A method for producing a stator of an alternating current dynamo-electric machine according to claim 4, wherein said step (c) comprises the step of:
   (c1) bending said laminated core assembly to form a first arc of said cylindrical stator, wherein said first arc constitutes only a first portion of said cylindrical stator.

7. A method for producing a stator of an alternating current dynamo-electric machine according to claim 6, further comprising the steps of:
   (d) laminating a plurality of second magnetic strips together to produce a second laminated core assembly having a rectangular parallelopiped shape and having a plurality of second slots;
   (e) disposing second electrical windings in said second slots; and
   (f) bending said second laminated core assembly to form a second arc of said cylindrical stator, wherein said second laminated core assembly is bent after said second electrical windings are disposed in said second slots and wherein said first arc and said second arc form at least a portion of said cylindrical stator.

8. A method for producing a stator of an alternating current dynamo-electric machine according to claim 1, further comprising the step of:
   (d) providing slits on a bottom portion of said slots of said laminated core assembly to facilitate bending of said laminated core assembly.

9. A method for producing a stator of an alternating current dynamo-electric machine according to claim 8, wherein said slits have sizes such that said slits disappear when said laminated core assembly is bent to produce said cylindrical stator.

10. A method for producing a stator of an alternating current dynamo-electric machine according to claim 4, further comprising the step of:
   (d) providing slits on a bottom portion of said slots of said laminated core assembly to facilitate bending of said laminated core assembly.

11. A method for producing a stator of an alternating current dynamo-electric machine according to claim 10, wherein said slits have sizes such that said slits disappear when said laminated core assembly is bent to form at least said arc of said cylindrical stator.

* * * * *